United States Patent
Vajravel

(10) Patent No.: US 10,635,816 B2
(45) Date of Patent: Apr. 28, 2020

(54) RESTRICTING REPROGRAMMING OF A REDIRECTED USB DEVICE

(71) Applicant: Wyse Technology L.L.C., Santa Clara, CA (US)

(72) Inventor: Gokul Thiruchengode Vajravel, Bangalore (IN)

(73) Assignee: Wyse Technology L.L.C., Santa Clara, CA (US)

( * ) Notice: Subject to any disclaimer, the term of this patent is extended or adjusted under 35 U.S.C. 154(b) by 421 days.

(21) Appl. No.: 15/089,818

(22) Filed: Apr. 4, 2016

(65) Prior Publication Data

US 2017/0286681 A1    Oct. 5, 2017

(51) Int. Cl.
*G06F 21/56* (2013.01)
*G06F 13/42* (2006.01)
*G06F 9/445* (2018.01)

(52) U.S. Cl.
CPC ........ *G06F 21/566* (2013.01); *G06F 9/44505* (2013.01); *G06F 13/4282* (2013.01); *G06F 2221/034* (2013.01)

(58) Field of Classification Search
CPC .................................................... G06F 21/566
See application file for complete search history.

(56) References Cited

U.S. PATENT DOCUMENTS

| | | | |
|---|---|---|---|
| 6,973,512 B1 * | 12/2005 | Koeman | G06F 13/102 710/10 |
| 7,478,180 B1 * | 1/2009 | Li | G06F 13/105 703/23 |
| 8,166,314 B1 * | 4/2012 | Raizen | G06F 21/78 711/164 |
| 8,452,995 B1 * | 5/2013 | Lachwani | G06F 1/266 713/320 |
| 9,397,944 B1 * | 7/2016 | Hobbs | H04L 47/00 |
| 2002/0143921 A1 * | 10/2002 | Stephan | G06F 13/4081 709/223 |
| 2006/0190666 A1 * | 8/2006 | Saitou | G06F 13/4027 710/313 |
| 2007/0198460 A1 * | 8/2007 | Yang | G06F 21/78 |
| 2008/0126628 A1 * | 5/2008 | Mullis | G06F 9/4411 710/63 |
| 2009/0222841 A1 * | 9/2009 | Mirajkar | G06F 13/102 719/321 |
| 2011/0173351 A1 * | 7/2011 | Aull | G06F 9/544 710/8 |

(Continued)

*Primary Examiner* — Saleh Najjar
*Assistant Examiner* — Devin E Almeida
(74) *Attorney, Agent, or Firm* — Kirton McConkie; Brian Tucker

(57) ABSTRACT

Reprogramming of a redirected USB device can be restricted to prevent the redirected USB device's firmware from being modified maliciously. A virtual bus driver can be configured to monitor USB request blocks (URBs) to identify whether an URB pertains to an attempt to alter the firmware of a redirected USB device. When an URB is identified as pertaining to an attempt to alter the firmware, the virtual bus driver can block the URB unless the URB is associated with an authorized user or application. In this way, only an authorized user or application will be allowed to modify the firmware of a redirected USB device thereby ensuring that a malicious user or application cannot modify the firmware in an improper manner.

20 Claims, 9 Drawing Sheets

(56) References Cited

U.S. PATENT DOCUMENTS

| | | | |
|---|---|---|---|
| 2012/0158822 A1* | 6/2012 | Dai | G06F 9/4413 |
| | | | 709/203 |
| 2013/0132618 A1* | 5/2013 | de Goede | G06F 13/105 |
| | | | 710/48 |
| 2016/0170929 A1* | 6/2016 | Pethe | G06F 13/102 |
| | | | 710/313 |
| 2016/0179565 A1* | 6/2016 | Chen | H04L 67/08 |
| | | | 710/313 |
| 2016/0196454 A1* | 7/2016 | Soffer | H01R 4/4809 |
| | | | 726/16 |
| 2018/0217948 A1* | 8/2018 | Li | G06F 9/45558 |

* cited by examiner

RESTRICTING REPROGRAMMING OF A REDIRECTED USB DEVICE

CROSS-REFERENCE TO RELATED APPLICATIONS

N/A

BACKGROUND

The present invention is generally directed to USB device redirection in a virtual desktop infrastructure (VDI) environment. USB device redirection generally refers to making a USB device that is connected to a client terminal accessible within a virtual desktop as if the USB device had been physically connected to the virtual desktop. In other words, when USB device redirection is implemented, a user can connect a USB device to his or her client terminal and the USB device will function as if it had been connected to the server.

FIGS. 1 and 2 and the following description will provide a general overview of how USB device redirection can be implemented in accordance with some embodiments of the present invention. In FIG. 1, a computing system 100 is depicted as including a number of client terminals 102a-102n (referenced generally herein as client(s) 102) in communication with a server 104 via a network 106. Server 104 can be configured to support a remote session (e.g., a remote desktop session) wherein a user at a client 102 can remotely access applications and data at the server 104 from the client 102. Such a connection may be established using any of several well-known techniques such as the Remote Desktop Protocol (RDP) and the Citrix® Independent Computing Architecture (ICA).

Client terminal 102 may represent a computer, a mobile phone (e.g., smart phone), a laptop computer, a thin client terminal, a personal digital assistant (PDA), a portable computing terminal, or a suitable terminal or device with a processor. Server 104 may represent a computer, a laptop computer, a computing terminal, a virtual machine (e.g., VMware® Virtual Machine), a desktop session (e.g., Microsoft Terminal Server), a published application (e.g., Microsoft Terminal Server) or a suitable terminal with a processor.

Client 102 may initiate a remote session with server 104 by sending a request for remote access and credentials (e.g., login name and password) to server 104. If server 104 accepts the credentials from client 102, then server 104 may establish a remote session, which allows a user at client 102 to access applications and data at server 104. During the remote session, server 104 sends display data to client 102 over network 106, which may include display data of a desktop and/or one or more applications running on server 104. The desktop may include, for example, icons corresponding to different applications that can be launched on server 104. The display data allows client 102 to locally display the desktop and/or applications running on server 104.

During the remote session, client 102 may send user commands (e.g., inputted via a mouse or keyboard at client 102) to server 104 over network 106. Server 104 may process the user commands from client 102 similar to user commands received from an input device that is local to server 104. For example, if the user commands include mouse movements, then server 104 may move a pointer on the desktop running on server 104 accordingly. When the display data of the desktop and/or application changes in response to the user commands, server 104 sends the updated display data to client 102. Client 102 locally displays the updated display data so that the user at client 102 can view changes at server 104 in response to the user commands Together, these aspects allow the user at client 102 to locally view and input commands to the desktop and/or application that is running remotely on server 104. From the perspective of the client side, the desktop running on server 104 may represent a virtual desktop environment.

FIG. 2 is a block diagram of a local device virtualization system 200 in accordance with embodiments of the present invention. System 200 may include client 102 in communication with server 104 over network 106 as illustrated in FIG. 1. Client 102 may include a proxy 210, a stub driver 220, and a bus driver 230. Client 102 can be connected to a device 240, as shown in FIG. 2. Server 104 may include an agent 250 and a virtual bus driver 260.

In accordance with USB device redirection techniques, while device 240 is not locally or physically connected to server 104 and is remote to server 104, device 240 appears to server 104 as if it is locally connected to server 104, as discussed further below. Thus, device 240 appears to server 104 as a virtual device 290.

By way of illustration and not limitation, device 240 may be any type of USB device including a machine-readable storage medium (e.g., flash storage device), a printer, a scanner, a camera, a facsimile machine, a phone, an audio device (e.g., a headset), a video device (e.g., a camera), a peripheral device, or other suitable device that can be connected to client 102. Device 240 may be an external device (i.e., external to client 102) or an internal device (i.e., internal to client 102).

Bus driver 230 can be configured to allow the operating system and programs of client 102 to interact with device 240. In one aspect, when device 240 is connected to client 102 (e.g., plugged into a port of client 102), bus driver 230 may detect the presence of device 240 and read information regarding device 240 ("device information") from device 240. The device information may include features, characteristics and other information specific to device 240 such as a device descriptor (e.g., product ID, vendor ID and/or other information), a configuration descriptor, an interface descriptor, an endpoint descriptor and/or a string descriptor. Bus driver 230 may communicate with device 240 through a computer bus or other wired or wireless communications interface.

In accordance with USB device redirection techniques, device 240 may be accessed from server 104 as if the device were connected locally to server 240. Device 240 may be accessed from server 104 when client 102 is connected to server 104 through a user session running on server 104. For example, device 240 may be accessible from the desktop running on server 104 (i.e., virtual desktop environment). To enable this, bus driver 230 may be configured to load stub driver 220 as the default driver for device 240. Stub driver 220 may be configured to report the presence of device 240 to proxy 210 and to provide the device information (e.g., device descriptor) to proxy 210. Proxy 210 may be configured to report the presence of device 240, along with the device information, to agent 250 of server 104 over network 106. Thus, stub driver 220 redirects device 240 to server 104 via proxy 210.

Agent 250 may be configured to receive the report from proxy 210 that device 240 is connected to client 102 and the device information. Agent 250 may further be configured to associate with the report from proxy 210 one or more identifiers for client 102 and/or for a user session through which client 102 is connected to server 104, such as a session number or a session locally unique identifier (LUID). Agent 250 can provide notification of device 240, along with the device information, to virtual bus driver 260. Virtual bus driver 260 (which may be a TCX USB bus driver, or any other bus driver) may be configured to create and store in memory a record corresponding to device 240, the record including at least part of the device information and session identifiers received from agent 250. Virtual bus driver 260 may be configured to report to operating system 170 of server 104 that device 240 is connected and to provide the device information to the operating system. This allows the operating system of server 104 to recognize the presence of device 240 even though device 240 is connected to client 102.

The operating system of server 104 may use the device information to find and load one or more appropriate device drivers for device 240 at server 104. Each driver may have an associated device object (object(s) 281a, 281b, . . . , 281n, referred to generally as device object(s) 281), as illustratively shown in FIG. 2. A device object 281 is a software implementation of a real device 240 or a virtualized (or conceptual) device 290. Different device objects 281 layer over each other to provide the complete functionality. The different device objects 281 are associated with different device drivers (driver(s) 282a, 282b, . . . 282n, referred to generally as device driver(s) 282). In an example, a device 240 such as a USB flash drive may have associated device objects including objects corresponding to a USB driver, a storage driver, a volume manager driver, and a file system driver for the device. The device objects 281 corresponding to a same device 240 form a layered device stack 280 for device 240. For example, for a USB device, a USB bus driver will create a device object 281a stating that a new device has been plugged in. Next, a plug-and-play (PNP) component of the operating system will search for and load the best driver for device 240, which will create another device object 281b that is layered over the previous device object 281a. The layering of device objects 281 will create device stack 280.

Device objects 281 may be stored in a memory of the server 104 associated with virtual bus driver 260. In particular, device objects 281 and resulting device stack 280 may be stored in random-access memory of server 104. Different devices 240/290 can have device stacks having different device objects and different numbers of device objects. The device stack may be ordered, such that lower level device objects (corresponding to lower level device drivers) have lower numbers than higher level device objects (corresponding to higher level device drivers). The device stack may be traversed downwards by traversing the stack from higher level objects to lower level objects. For example, in the case of an illustrative device stack 280 corresponding to a USB flash drive, the ordered device stack may be traversed downwards from a high-level file system driver device object, to a volume manager driver device object, to a storage driver device object, to a USB driver device object, and finally to a low-level virtual bus driver device object. Different device stacks 280 can be layered over each other to provide the functionality of the devices 240/290 inside devices, like USB Headsets, or USB pen drives. A USB pen drive, for example, can create a USB device stack first, over which it can create a storage device stack, where each of the device stacks have two or more device objects.

Once one or more device object(s) 281 are loaded by operating system 170 of server 104, each device object 281 can create a symbolic link (also referred to as a "device interface") to device object 281 and associated device driver 282. The symbolic link is used by applications running on server 104 to access device object 281 and device 240/290. The symbolic link can be created by a call to a function such as IoCreateSymbolicLink( ) including such arguments as a name for the symbolic link, and a name of device object 281 or associated device 240. In one example, for example, a symbolic link to a USB flash drive device 240 is created by a call from a device object 281 for device 240 to the function IoCreateSymbolicLink( ) including arguments "\\GLOBAL??\C:" (i.e., the name for the symbolic link) and "\Device\HarddiskVolume1" (i.e., a name of the device object).

The creation of a symbolic link results in an entry being created in an object manager namespace (OMN) of operating system 170. The OMN stores information on symbolic links created for and used by operating system 170, including symbolic links for devices 240, virtualized devices 290, and applications 270 running on server 104.

As a result of the symbolic link creation process, a symbolic link to device 240 is enumerated in the OMN of server 104. Once the presence of device 240 is reported to operating system 170 of server 104, device 240 may be accessible from a user session (and associated desktop) running on server 104 (i.e., virtual desktop environment). For example, device 240 may appear as an icon on the virtual desktop environment and/or may be accessed by applications running on server 104.

An application 270 running on server 104 may access device 240 by sending a transaction request including the symbolic link for device 240 to operating system 170. Operating system 170 may consult the Object Manager Namespace to retrieve an address or other identifier for the device itself 240 or for a device object 281 associated with device 240. Using the retrieved address or identifier, operating system 170 forwards the transaction request for device 240 either directly, through a device object 281 of device stack 280, and/or through virtual bus driver 260. Virtual bus driver 260 may direct the transaction request to agent 250, which sends the transaction request to proxy 210 over network 106. Proxy 210 receives the transaction request from agent 250, and directs the received transaction request to stub driver 220. Stub driver 220 then directs the transaction request to device 240 through bus driver 230.

Bus driver 230 receives the result of the transaction request from device 240 and sends the result of the transaction request to stub driver 220. Stub driver 220 directs the result of the transaction request to proxy 210, which sends the result of the transaction request to agent 250 over network 106. Agent 250 directs the result of the transaction request to virtual bus driver 260. Virtual bus driver 260 then directs the result of the transaction request to application 270 either directly or through a device object 281 of device stack 280.

Thus, virtual bus driver 260 may receive transaction requests for device 240 from application 270 and send results of the transaction requests back to application 270 (either directly or through a device object 281 of device stack 280). As such, application 270 may interact with virtual bus driver 260 in the same way as with a bus driver for a device that is connected locally to server 104. Virtual bus driver 260 may hide the fact that it sends transaction requests to agent 250 and receives the results of the transaction requests from agent 250 instead of a device that is connected locally to server 104. As a result, device 240 connected to client 102 may appear to application 270 as if the physical device 240 is connected locally to server 104.

A key feature of USB devices is that all USB devices regardless of their device class employ the same connector. This allows any USB device to be coupled to any host in the same manner. The functionality that any USB device may provide is dictated by the USB controller chip within the USB device. For example, when coupled to a host, a controller chip of a USB keyboard can identify itself as a keyboard (or more specifically, as a device in the HID class) thereby causing the host to load appropriate drivers to enable the keyboard functionality on the host.

Recently, malware creators have exploited this USB functionality as a way to bypass malware scanners. Although malware scanners can typically scan the data region of a USB device (e.g., the storage region of a USB mass storage device), these scanners cannot access the USB device's firmware. Malware creators are therefore designing malware that will alter a USB device's firmware to reprogram it for a malicious purpose. For example, malware could be configured to modify a USB printer's firmware to emulate a keyboard (i.e., to cause the host to load the appropriate keyboard drivers). The firmware could also be modified to issue keyboard input (as if a user had actually typed on a keyboard) where the input would perform some malicious task such as deleting or corrupting files or installing malware on the host. The malware could in turn modify the firmware of other USB devices to enable the malware to spread to any other host to which the infected USB device may be connected. Similarly, the firmware could be modified to emulate a network card and change the host's DNS setting to redirect traffic. Many other types of malicious actions could also be taken. These types of exploits are commonly referred to as BadUSB.

As indicated above, there currently is no practical solution for preventing these exploits since malware scanners cannot access the firmware of a USB device. Also, recovery from these exploits is often incomplete. Even if a host is restored after a malware infection, because the source of the infection is in the USB device rather than the host itself, the host can quickly become re-infected if the USB device is again connected.

BRIEF SUMMARY

The present invention extends to methods, systems, and computer program products for restricting reprogramming of a redirected USB device to prevent the redirected USB device's firmware from being modified maliciously. A virtual bus driver can be configured to monitor USB request blocks (URBs) to identify whether an URB pertains to an attempt to alter the firmware of a redirected USB device. When an URB is identified as pertaining to an attempt to alter the firmware, the virtual bus driver can block the URB unless the URB is associated with an authorized user or application. In this way, only an authorized user or application will be allowed to modify the firmware of a redirected USB device thereby ensuring that a malicious user or application cannot modify the firmware in an improper manner In some embodiments, the present invention is implemented as a method, performed by a virtual bus driver in a VDI environment, for selectively blocking an URB to prevent a redirected USB device's firmware from being improperly modified. An URB can be received at the virtual bus driver. The URB is directed to a USB device that is being redirected by a client terminal within the VDI environment. A header of the URB can be accessed to determine whether the header specifies that the URB pertains to a vendor specific command. When it is determined that the header specifies that the URB pertains to a vendor specific command, the URB can be blocked.

In another embodiment, the present invention is implemented as computer storage media storing computer executable instructions which when executed by one or more processors implement a virtual bus driver in a VDI environment, the virtual bus driver being configured to selectively block URBs based on whether the URBs pertain to an attempt to modify firmware of a redirected USB device. The virtual bus driver performs the selective blocking on each received URB by: determining whether the URB includes a header indicating that the URB pertains to a vendor specific command, and if so, blocking the URB; and determining whether the URB pertains to a bulk transfer and defines a command block wrapper having a command block specifying a vendor specific opcode, and if so, blocking the URB.

In another embodiment, the present invention is implemented as a system for implementing a VDI environment. The system includes an agent that executes on a server and that is configured to establish remote sessions with client terminals including to implement USB device redirection over the remote sessions. The system can also include a virtual bus driver that executes on the server and that is configured to evaluate each URB that targets a redirected USB device to determine whether the URB pertains to an attempt to modify firmware on the target USB device. When the virtual bus driver determines that the URB pertains to an attempt to modify firmware on the target USB device, the URB is routed to the agent only if an application or user associated with the URB is authorized to modify the firmware.

This summary is provided to introduce a selection of concepts in a simplified form that are further described below in the Detailed Description. This Summary is not intended to identify key features or essential features of the claimed subject matter.

BRIEF DESCRIPTION OF THE DRAWINGS

Understanding that these drawings depict only typical embodiments of the invention and are not therefore to be considered limiting of its scope, the invention will be described and explained with additional specificity and detail through the use of the accompanying drawings in which.

DETAILED DESCRIPTION

Figure 1:
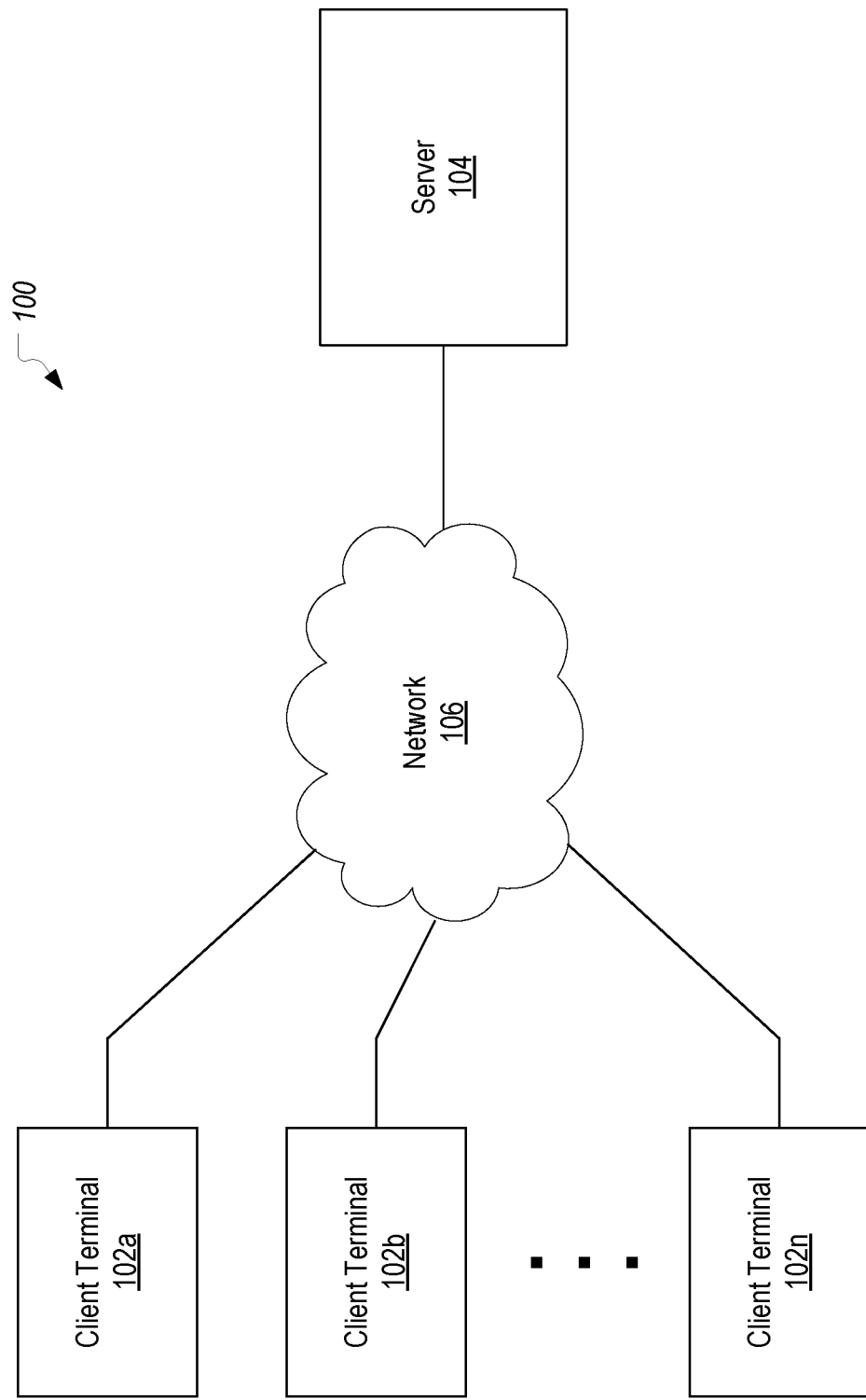
FIG. 1 illustrates an example computing environment in which the present invention can be implemented.
Figure 2:
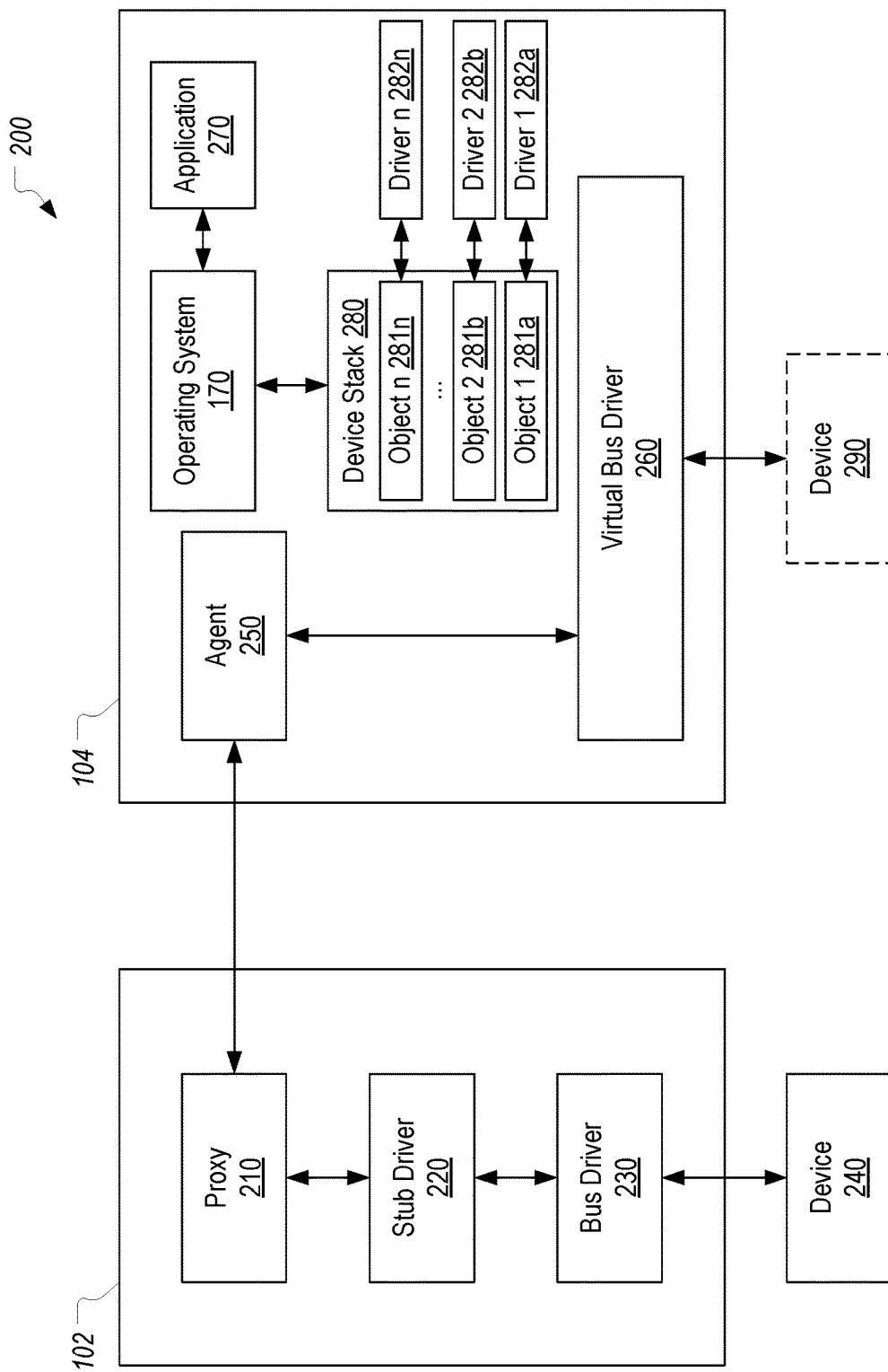
FIG. 2 illustrates how a USB device can be redirected from a client terminal to a server.
Figure 3A:
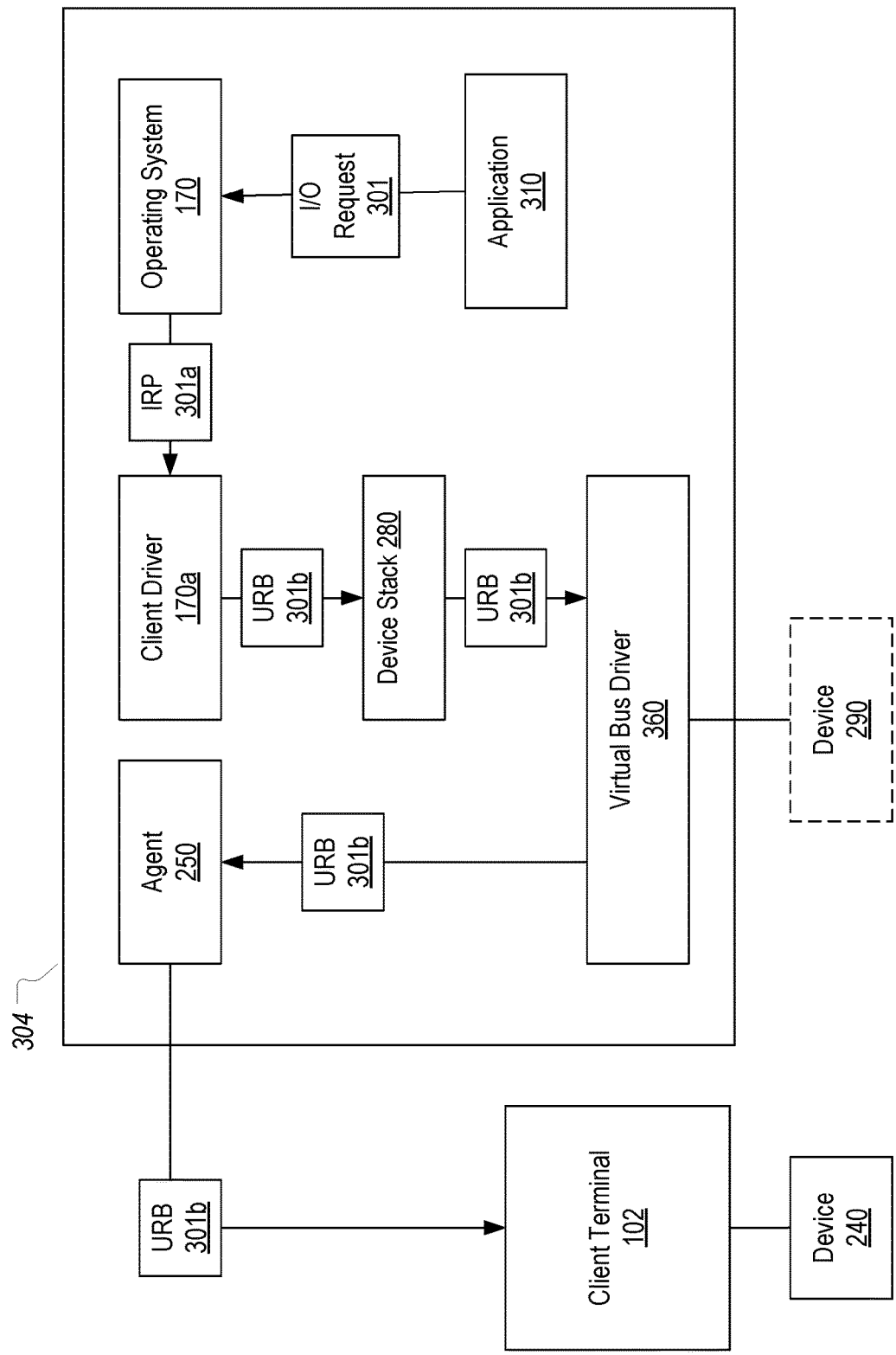
FIGS. 3A and 3B generally illustrate how a virtual bus driver can forward and block an URB respectively based on whether the URB pertains to an attempt to modify a USB device's firmware.
Figure 3B:
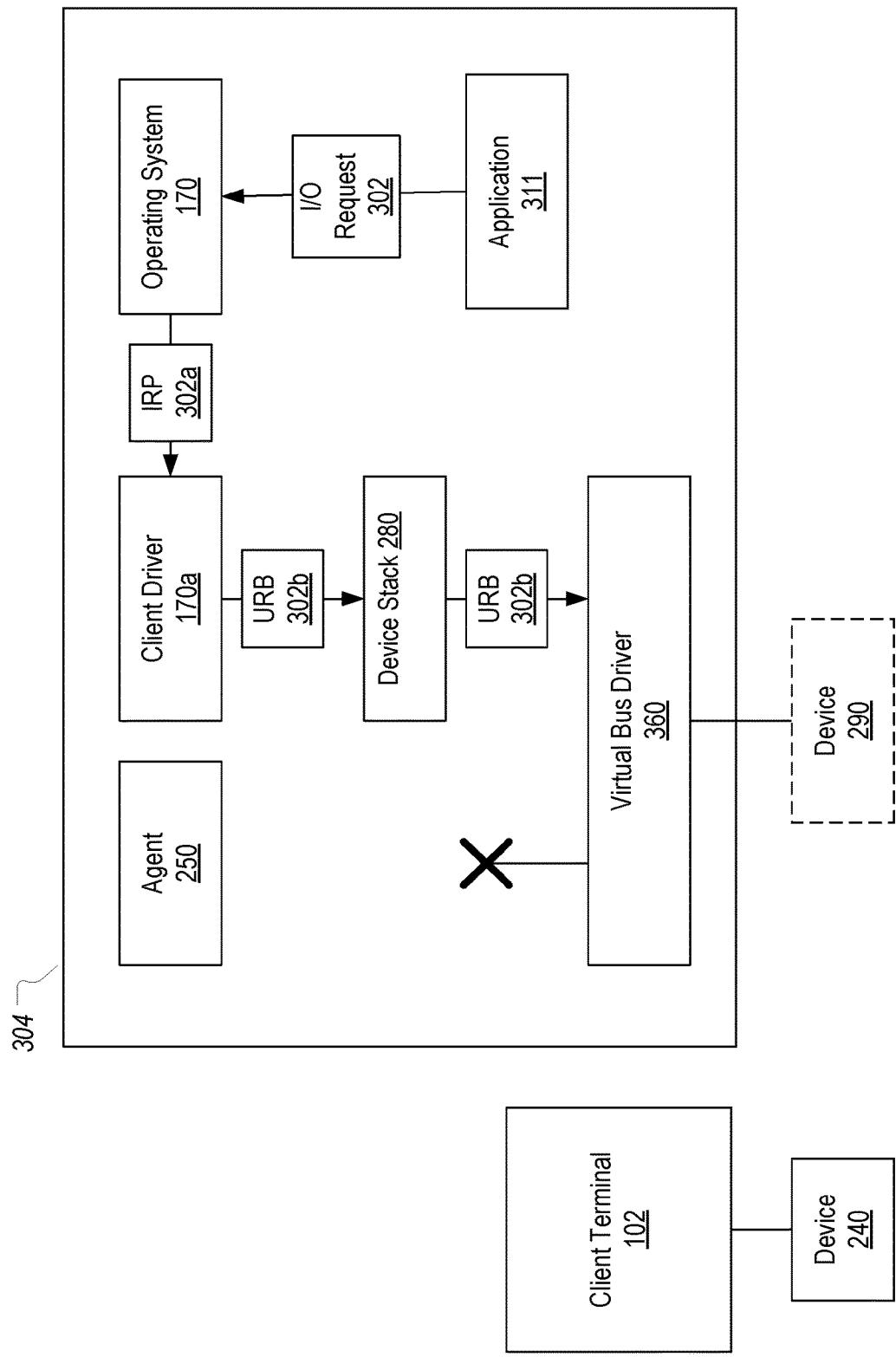

In this specification, the term "application" should be construed broadly to refer to any computing construct that may attempt to access a USB device via its corresponding client driver. For example, FIGS. 3A and 3B provide an example where an application employs standard operating system I/O functionality to initiate the I/O process which will result in the creation of an URB. However, the present invention should not be limited to instances where standard operating system I/O functionality initiates the I/O process, but should also extend to other instances including where an application may directly access the client driver or other driver in the USB device's stack.

As is known in the art, in order to communicate with a USB device, a USB client driver must create an appropriate URB which it then submits to the device stack for the intended USB device (e.g., the device stack that has been instantiated for the corresponding class of USB device). The client driver may populate the URB based on an I/O request packet (IRP) that the client driver receives from the operating system. When the device stack receives an URB, the device stack can perform any appropriate processing on the URB and then submit the URB to the bus driver for routing to the USB device.

In the case of a redirected USB device, the bus driver that will receive the URB from the device stack is virtual bus driver 360. FIGS. 3A and 3B generally illustrate how virtual bus driver 360 can be configured to selectively block URBs when it is determined that an URB pertains to an attempt to modify firmware of a USB device. In FIG. 3A, an application 310 is shown as submitting an I/O request 301 to operating system 170. Operating system 170 (e.g., the I/O Manager in the Windows Operating System) can generate an IRP 301a and submit this IRP to the client driver registered for the target device. In this example, it will be assumed that I/O request 301 is intended for redirected USB device 240 and that client driver 170a is the client driver registered for this device. Client driver 170a can be part of operating system 170 (e.g., a Windows-provided client driver) or a vendor provided driver.

Client driver 170a processes IRP 301a by creating an appropriate URB 301b and passing URB 301b to device stack 280. Although not shown, IRP 301a would be associated with URB 301b and accessible to the underlying drivers. The drivers in device stack 280 may perform some processing on URB 301b and ultimately pass URB 301b to virtual bus driver 360. In accordance with embodiments of the present invention, virtual bus driver 360 can be configured to examine URB 301b to determine whether it is configured to modify the firmware of the target USB device. In FIG. 3A, it will be assumed that virtual bus driver 360 determines that URB 301b will not modify the firmware of device 240 (or possibly that, if URB 301b will modify the firmware, application 310 or a corresponding user is authorized to do so). Accordingly, virtual bus driver 360 routes URB 301b to agent 250 which in turn routes URB 301b to device 240 via client terminal 102.

FIG. 3B illustrates a similar process in which an application 311 issues an I/O request 302, operating system 170 generates a corresponding IRP 302a, and client driver 170a populates a corresponding URB 302b which is passed down through device stack 280. However, in contrast to FIG. 3A, in FIG. 3B it will be assumed that virtual bus driver 360 determines that URB 302b is configured to modify the firmware on device 240 (and that application 311 and/or the corresponding user is not authorized to do so). As a result of this determination, virtual bus driver 360 will prevent URB 302b from being routed to agent 250 and therefore prevent device 240 from receiving URB 302b. In this way, virtual bus driver 360 can prevent the modification of the firmware on device 240.

For example, if application 311 had become infected with malware (e.g., malware configured to propagate BadUSB), virtual bus driver 360 would block any attempt that application 311 may make to modify the firmware of USB device 240 or any other redirected USB device. Because this blocking is performed by virtual bus driver 360 through which any request to access a redirected device must pass, it can be ensured that malware will not be able to bypass these access restrictions. Also, by performing this blocking at virtual bus driver 360, the present invention will have minimal or no impact on I/O that does not involve accessing a redirected device's firmware. Such I/O can be performed in its standard manner with virtual bus driver 360 simply forwarding the corresponding URBs on to the target device.

Figure 4A:
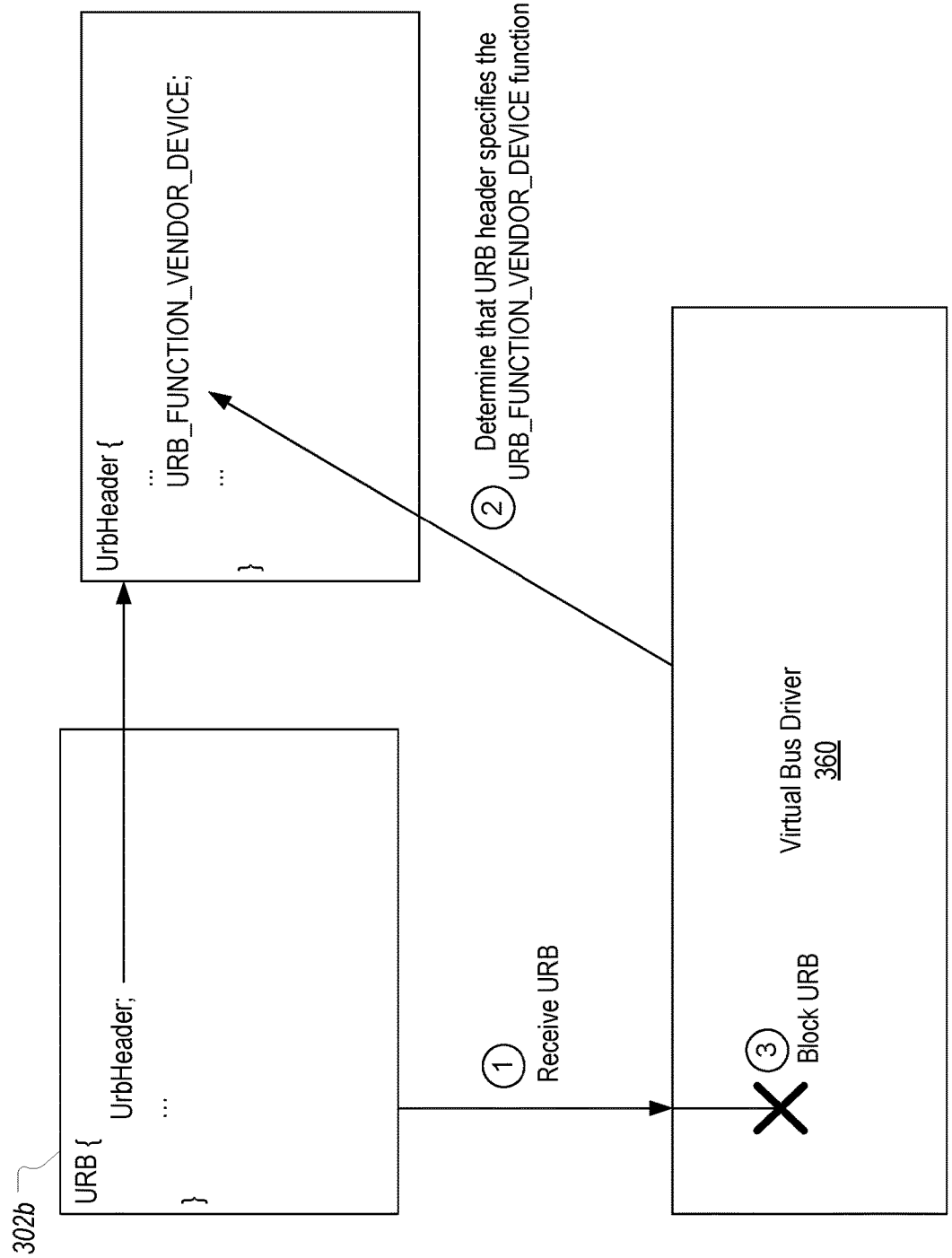
FIG. 4A illustrates one way in which the virtual bus driver can determine if an URB pertains to an attempt to modify a USB device's firmware.
Figure 4B:
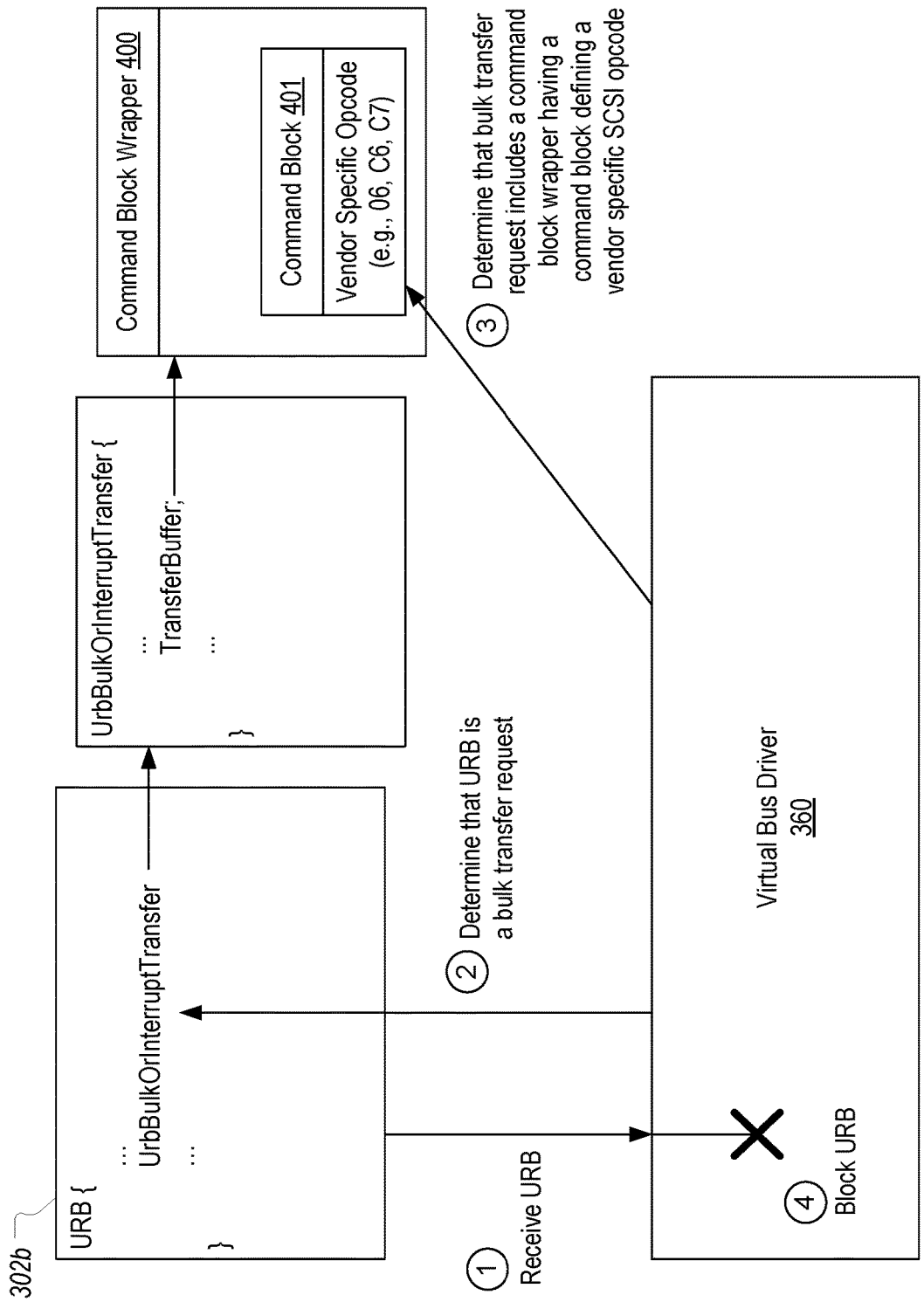
FIG. 4B illustrates another way in which the virtual bus driver can determine if an URB pertains to an attempt to modify a USB device's firmware.

FIGS. 4A and 4B each provides an example of how virtual bus driver 360 can detect whether a URB pertains to an attempt to modify firmware on a USB device. In FIG. 4A, virtual bus driver 360 is shown as receiving URB 302b in step 1. As described above, URB 302b would typically be received from the lowest driver in device stack 280; however, this need not be the case. Regardless of how it receives URB 302b, in step 2, virtual bus driver 360 can examine the header of URB 302b. An URB includes a number of different member structures, one of which is the _URB_HEADER structure (which in FIG. 4A is named UrbHeader). The _URB_HEADER structure defines a number of members including a Function member that identifies the requested operation for the URB. In accordance with embodiments of the present invention, virtual bus driver 360 can determine whether the value of the Function member in the _URB_HEADER structure of the URB equals URB_FUNCTION_VENDOR_DEVICE. The URB_FUNCTION_VENDOR_DEVICE function indicates that the URB is a vendor-defined request for the USB device and is oftentimes employed by USB vendors to modify the firmware of USB devices.

As shown in FIG. 4A, URB 302b includes a header that specifies the URB_FUNCTION_VENDOR_DEVICE function. Therefore, upon determining that URB 302b specifies a vendor-defined request (by virtue of its reference to the URB_FUNCTION_VENDOR_DEVICE function), virtual bus driver 360 can block URB 302b so that it will not be routed to agent 250. In addition to blocking URB 302b, virtual bus driver 360 can return a proper error code (e.g., access denied, device not found, etc.) so that the I/O request can be completed.

FIG. 4B illustrates another technique that virtual bus driver 360 can employ to determine whether to block an URB. In a first step, virtual bus driver 360 is shown as receiving URB 302b. For purposes of this example, it will be assumed that URB 302b does not specify the URB_FUNCTION_VENDOR_DEVICE function in its _URB_HEADER structure. In contrast, in FIG. 4B, URB 302b includes the _URB_BULK_OR_INTERRUPT_TRANSFER structure (which has a name of UrbBulkOrinterruptTransfer in FIG. 4B). As is known in the art, the _URB_

BULK_OR_INTERRUPT_TRANSFER structure can be employed to perform a bulk transfer with a USB mass storage device.

The _URB_BULK_OR_INTERRUPT_TRANSFER structure defines a number of members including a TransferBuffer member (or a TransferBufferMDL member) which points to a buffer containing the data to be transferred (or to a memory descriptor list (MDL) describing the buffer). In this example, it will be assumed that the _URB_BULK_OR_INTERRUPT_TRANSFER structure also defines that this data in the buffer is to be transferred to device 240 (e.g., by setting the USBD_TRANSFER_DIRECTION_IN flag). As shown in FIG. 4B, this data to be transferred can be structured as a command block wrapper 400 that includes a command block 401. Command block 401 can include a SCSI opcode which defines the type of operation to be performed using the data.

There are a large number of possible SCSI opcodes, many of which define standard SCSI operations for accessing data. However, some opcodes are reserved as vendor-specific opcodes. Of these vendor-specific opcodes, 0x06, 0xC6, and 0xC7 are oftentimes employed by the vendor as an opcode for modifying the firmware on the USB device. In accordance with embodiments of the present invention, virtual bus driver 360 can examine an URB to determine whether it is a bulk transfer request, and if so, whether it includes a command block wrapper having a command block defining a vendor-specific opcode (e.g., 0x06, 0xC6, or 0xC7). For example, in FIG. 4B, virtual bus driver 360 determines that URB 302b is a bulk transfer request (by virtue of its inclusion of the _URB_BULK_OR_INTERRUPT_TRANSFER structure) in step 2. Then, in step 3, virtual bus driver 360 determines that command block 401 of command block wrapper 400 defines a vendor-specific opcode (as opposed to a mandatory or optional opcode). In response, in step 4, virtual bus driver 360 can block URB 302b so that it is not routed to agent 250. In this way, virtual bus driver 360 can prevent the firmware of device 240 from being modified even when the URB_FUNCTION_VENDOR_DEVICE function is not employed.

It is noted that, even with this selective blocking of some URBs, applications will still be able to access a redirected USB device in a typical manner In particular, virtual bus driver 360 will still allow URBs that do not pertain to an attempt to modify firmware to be routed on to agent 250. Therefore, the present invention can safeguard against malicious and/or improper modifications to device firmware without unduly limiting access to the device.

Figure 5:
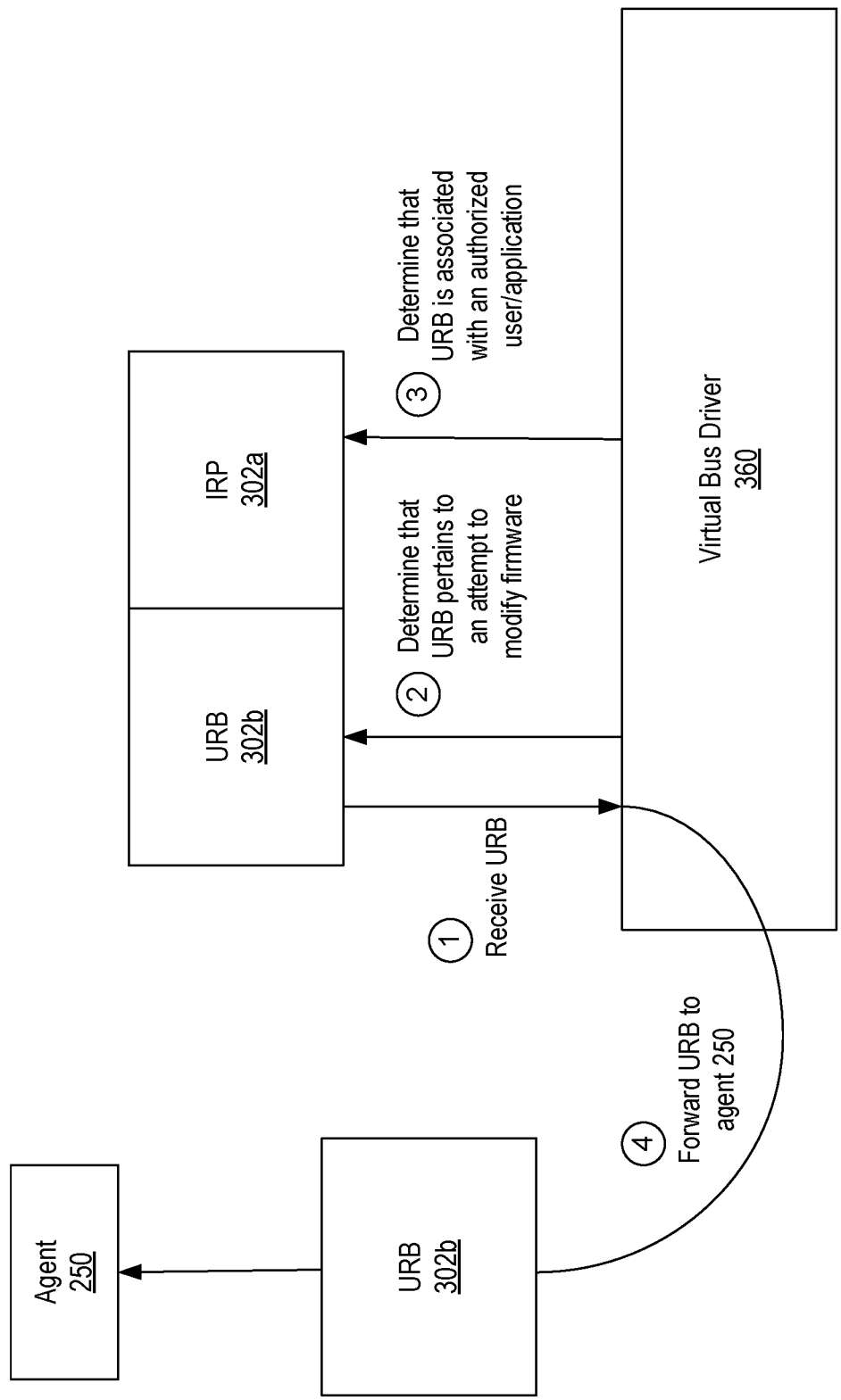
FIG. 5 illustrates how the virtual bus driver can determine if an URB pertaining to an attempt to modify a USB device's firmware should still be allowed.

Further, the present invention can be configured to still allow a USB device's firmware to be modified when the modification is being performed by an authorized user and/or application. FIG. 5 illustrates how this can be performed. As indicated above, the client driver for a particular USB device receives an IRP and creates a corresponding URB for the IRP. The IRP contains (or provides access to) information regarding the source of the IRP. For example, with reference to FIG. 3A, virtual bus driver 360 could employ a number of different techniques to determine that the source of URB 301b is application 310. Similarly, virtual bus driver 360 could employ a number of different techniques to determine that application 310 is executing within a particular user's session (e.g., within an administrator's session).

With reference to FIG. 5, virtual bus driver 360 is shown as receiving URB 302b. In step 2, virtual bus driver 360 determines that URB 302b pertains to an attempt to modify device 240's firmware (e.g., as shown in FIGS. 4A and 4B). However, in this example, virtual bus driver 360 also determines whether URB 302b is associated with an authorized application and/or user in step 3. In some embodiments, this determination can be made by accessing IRP 302a. For example, virtual bus driver 360 could employ the PsGetCurrentProcessId function to obtain the ProcessID associated with IRP 302a and the ZwQueryInformationProcess function to retrieve the image file name of application 311. If the retrieved image file name matches that of an authorized application (e.g., a device or session management application), virtual bus driver 360 can forward URB 302b on to agent 250 in step 4 so that device 240's firmware will be updated.

In a similar manner, virtual bus driver 360 could obtain a session ID associated with IRP 302a (e.g., by employing the ProcessIdToSessionId function) and then employ the session ID to identify which user has established the session. If the identified user is an authorized user, virtual bus driver 360 can forward URB 302b on to agent 250 in step 4 so that device 240's firmware will be updated. Accordingly, virtual bus driver 360 can be configured to maintain a listing of authorized applications and/or users to enable these determinations.

Figure 6:
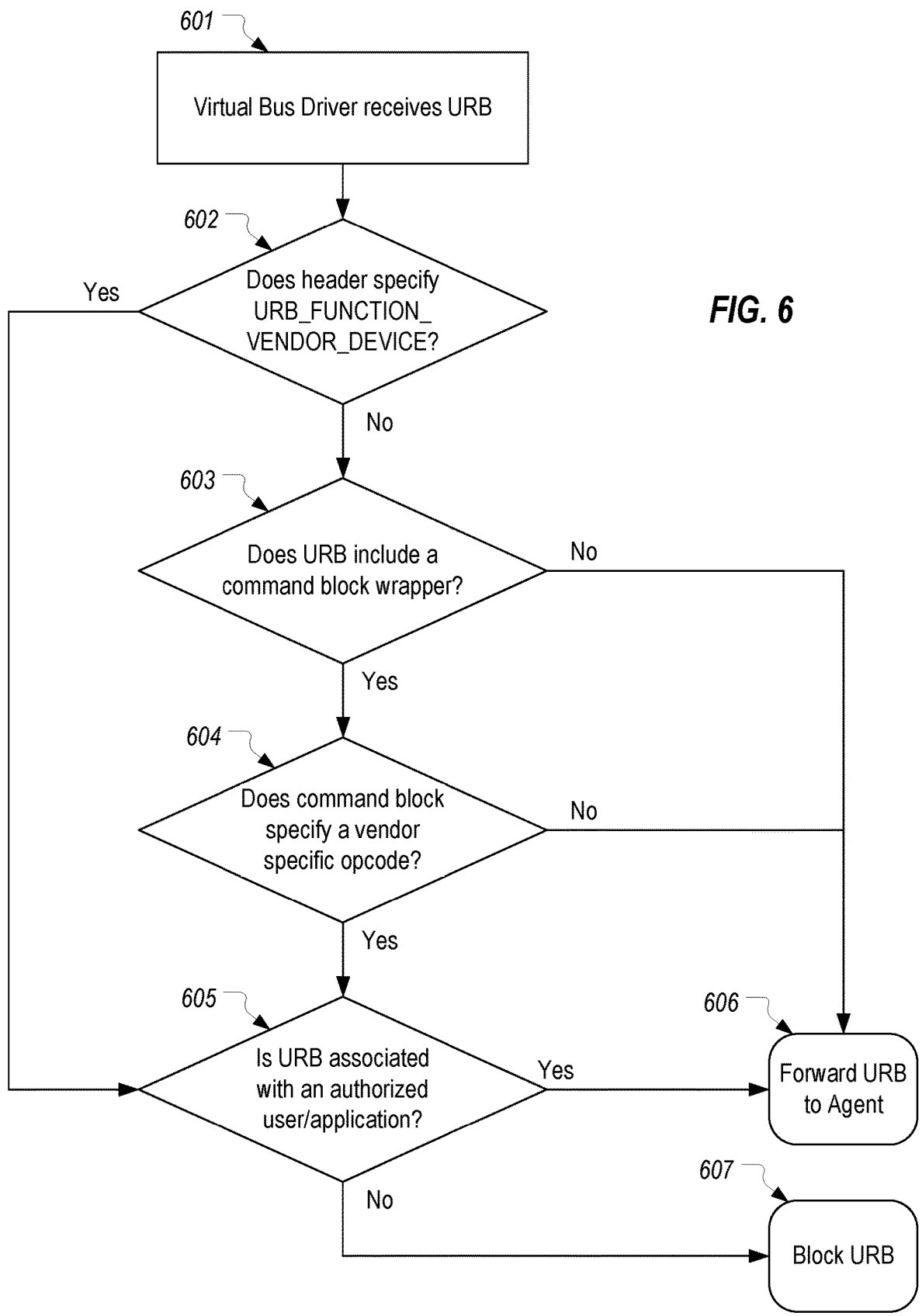
FIG. 6 provides a flowchart of an example process that a virtual bus driver can perform to selectively block an URB.

FIG. 6 provides a flowchart of a process that virtual bus driver 360 can implement when it receives an URB to determine whether the URB should be forwarded on to agent 250. In an initial step 601, virtual bus driver 360 receives an URB. Then, in step 602, virtual bus driver 360 determines whether the header of the URB specifies the URB_FUNCION_VENDOR_DEVICE function. If so, it can be concluded that the URB pertains to an attempt to modify a USB device's firmware and processing can jump to step 605. However, if the header of the URB does not specify this function, in step 603, virtual bus driver 360 can then determine whether the URB defines a command block wrapper (e.g., whether the URB pertains to a bulk or interrupt transfer with a mass storage device). If not, the URB can be forwarded to agent 250 in step 606. However, if the URB defines a command block wrapper, in step 604, virtual bus driver 360 can then determine whether the command block wrapper includes a vendor specific opcode. If not, the URB can be forwarded to agent 250 in step 606.

In contrast, if the command block wrapper includes a vendor specific opcode (e.g., 0x06, 0xC6, or 0xC7), it can be concluded that the URB pertains to an attempt to modify a USB device's firmware. In step 605, when it is determined that the URB is an attempt to modify the firmware, virtual bus driver 360 can also determine whether the URB is associated with an authorized user and/or application. If so, virtual bus driver 360 can forward the URB to agent 250 in step 606. However, if the URB is not associated with an authorized user and/or application, virtual bus driver 360 can block the URB in step 607 thereby protecting the USB device's firmware from being improperly updated.

Figure 7:
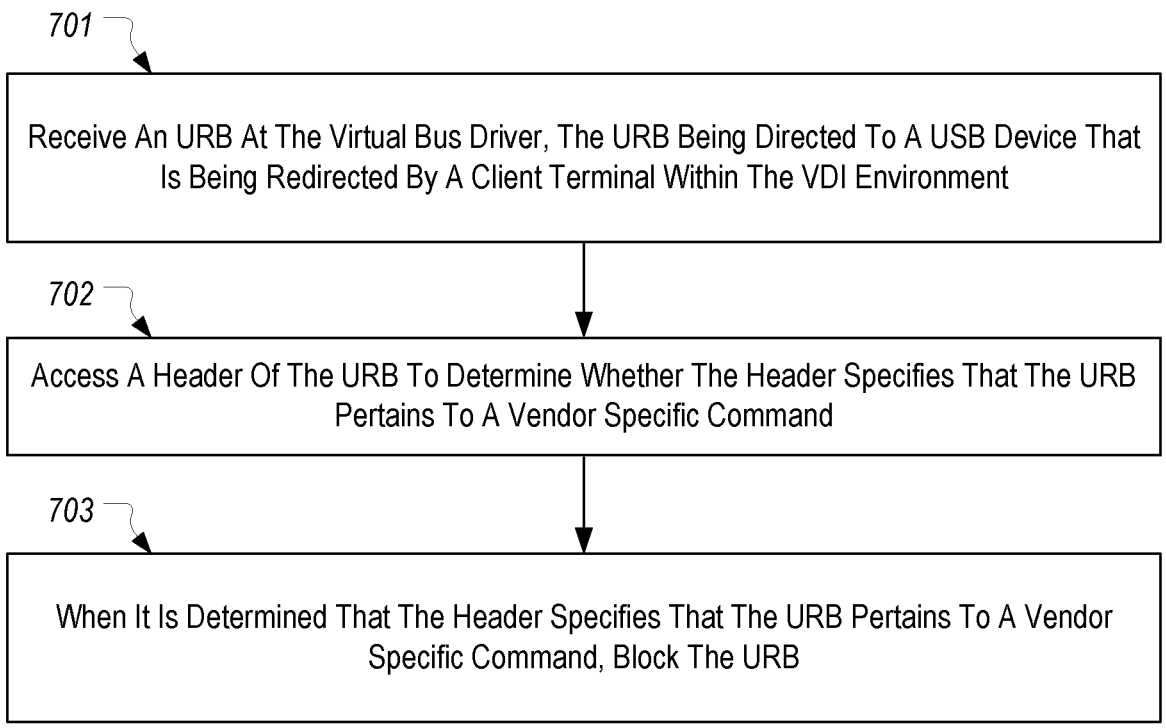
FIG. 7 illustrates a flowchart of an example method for selectively blocking an URB to prevent a redirected USB device's firmware from being improperly modified.

FIG. 7 provides a flowchart of an example method 700 for selectively blocking an URB. Method 700 can be implemented by a virtual bus driver in a VDI environment such as virtual bus driver 360.

Method 700 includes an act 701 of receiving an URB at the virtual bus driver, the URB being directed to a USB device that is being redirected by a client terminal within the VDI environment. For example, virtual bus driver 360 can receive URB 301b or 302b that are directed to device 240.

Method 700 includes an act 702 of accessing a header of the URB to determine whether the header specifies that the URB pertains to a vendor specific command For example, virtual bus driver 360 can access the _URB_HEADER structure of the URB to determine whether the _URB_ HEADER structure indicates that the URB pertains to a vendor specific command (e.g., by including a function member having a value of URB_FUNCTION_VENDOR_DEVICE).

Method 700 includes an act 703 of, when it is determined that the header specifies that the URB pertains to a vendor specific command, blocking the URB. For example, virtual bus driver 360 can block URB 302b upon determining that the _URB_HEADER structure within URB 302b indicates that URB 302b pertains to a vendor specific command Embodiments of the present invention may comprise or utilize special purpose or general-purpose computers including computer hardware, such as, for example, one or more processors and system memory. Embodiments within the scope of the present invention also include physical and other computer-readable media for carrying or storing computer-executable instructions and/or data structures. Such computer-readable media can be any available media that can be accessed by a general purpose or special purpose computer system.

Computer-readable media is categorized into two disjoint categories: computer storage media and transmission media. Computer storage media (devices) include RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other similarly storage medium which can be used to store desired program code means in the form of computer-executable instructions or data structures and which can be accessed by a general purpose or special purpose computer. Transmission media include signals and carrier waves.

Computer-executable instructions comprise, for example, instructions and data which, when executed by a processor, cause a general purpose computer, special purpose computer, or special purpose processing device to perform a certain function or group of functions. The computer executable instructions may be, for example, binaries, intermediate format instructions such as assembly language or P-Code, or even source code.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like.

The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices. An example of a distributed system environment is a cloud of networked servers or server resources. Accordingly, the present invention can be hosted in a cloud environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description.

What is claimed:

1. A method, performed by a virtual bus driver that is loaded on a server in a virtual desktop infrastructure (VDI) environment, for selectively blocking a USB request block (URB) to prevent a redirected USB device's firmware from being improperly modified, the method comprising:
   receiving an URB at the virtual bus driver, the URB being directed to a USB device that is being redirected by a client terminal within the VDI environment;
   accessing, by the virtual bus driver, a header of the URB to determine whether a function member defined within the header is set to a code that specifies that the URB defines a vendor specific command to be performed by the USB device; and
   when the virtual bus driver determines that the function member defined within the header is set to the code that specifies that the URB defines a vendor specific command, blocking, by the virtual bus driver, the URB.

2. The method of claim 1, wherein the code that specifies that the URB defines a vendor specific command is URB_FUNCTION_VENDOR_DEVICE.

3. The method of claim 1, wherein blocking the URB includes returning an error to a higher level driver.

4. The method of claim 1, further comprising:
   when the virtual bus driver determines that the function member defined within the header is set to the code that specifies that the URB defines a vendor specific command and that the URB is associated with an authorized application or user, forwarding, by the virtual bus driver, the URB to an agent such that the URB will be routed to the USB device.

5. The method of claim 4, wherein determining that the URB is associated with an authorized application or user comprises identifying a process ID associated with an I/O request packet (IRP) for which the URB was generated.

6. The method of claim 1, wherein, when the virtual bus driver determines that the function member defined within the header is not set to the code that specifies that the URB defines a vendor specific command, the method further comprises:
   determining, by the virtual bus driver, whether the URB pertains to a bulk transfer;
   when the virtual bus driver determines that the URB pertains to a bulk transfer, determining, by the virtual bus driver, whether the URB specifies a SCSI vendor opcode; and
   when the virtual bus driver determines that the URB specifies a SCSI vendor opcode, blocking, by the virtual bus driver, the URB.

7. The method of claim 6, further comprising:
   when the virtual bus driver determines that the URB specifies a SCSI vendor opcode and that the URB is associated with an authorized application or user, forwarding, by the virtual bus driver, the URB to an agent such that the URB will be routed to the USB device.

8. The method of claim 6, wherein determining whether the URB pertains to a bulk transfer comprises determining whether the URB includes the URB_BULK_OR_INTERRUPT_TRANSFER structure.

9. The method of claim 8, wherein determining whether the URB specifies a SCSI vendor opcode comprises determining whether the URB_BULK_OR_INTERRUPT_TRANSFER structure defines a command block wrapper that includes a command block containing a SCSI vendor opcode.

10. The method of claim 6, wherein the SCSI vendor opcode comprises one of 0x06, 0xC6, or 0xC7.

11. The method of claim 6, further comprising:
when the virtual bus driver determines that the URB does not pertain to a bulk transfer, forwarding, by the virtual bus driver, the URB to an agent such that the URB will be routed to the USB device.

12. The method of claim 6, further comprising:
when the virtual bus driver determines that the URB pertains to a bulk transfer but does not specify a SCSI vendor opcode, forwarding, by the virtual bus driver, the URB to an agent such that the URB will be routed to the USB device.

13. One or more computer storage media storing computer executable instructions which when executed by one or more processors implement a virtual bus driver that is configured to execute on a server in a virtual desktop infrastructure (VDI) environment, the virtual bus driver being configured to selectively block USB request blocks (URBs) based on whether the URBs pertain to an attempt to modify firmware of a redirected USB device, the virtual bus driver performing the selective blocking on each received URB by:
   determining whether the URB includes a header having a function member set to a code that specifies that the URB defines a vendor specific command, and if so, blocking the URB; and
   determining whether the URB pertains to a bulk transfer and defines a command block wrapper having a command block specifying a vendor specific opcode, and if so, blocking the URB.

14. The computer storage media of claim 13, wherein the virtual bus driver is further configured to:
   determine whether an URB to be blocked is associated with an authorized application and/or user, and if so, allowing the URB such that the URB is forwarded towards a target USB device.

15. The computer storage media of claim 13, wherein determining whether the URB includes a header having a function member set to a code that specifies that the URB defines a vendor specific command comprises determining whether the function member is set to URB_FUNCTION_VENDOR_DEVICE.

16. The computer storage media of claim 13, wherein determining whether the URB pertains to a bulk transfer comprises determining whether the URB includes the URB_BULK_OR_INTERRUPT_TRANSFER structure.

17. The computer storage media of claim 16, wherein determining whether the URB defines a command block wrapper having a command block specifying a vendor specific opcode comprises determining whether the URB_BULK_OR_INTERRUPT_TRANSFER structure includes a member that identifies a buffer containing a command block wrapper.

18. The computer storage media of claim 17, wherein the vendor specific opcode comprises one of 0x06, 0xC6, or 0xC7.

19. One or more computer storage media storing computer executable instructions which when executed implement components of a virtual desktop infrastructure (VDI) environment, the components comprising:
   an agent that executes on a server and that is configured to establish remote sessions with client terminals including to implement USB device redirection over the remote sessions; and
   a virtual bus driver that executes on the server and that is configured to evaluate each USB request block (URB) that targets a redirected USB device to determine whether the URB pertains to an attempt to modify firmware on the target USB device such that, when the virtual bus driver determines that the URB pertains to an attempt to modify firmware on the target USB device, the URB is routed to the agent only if an application or user associated with the URB is authorized to modify the firmware, wherein the virtual bus driver determines that the URB pertains to an attempt to modify firmware on the target USB device by one of:
      determining that a header of the URB includes a function member having a value of URB_FUNCTION_VENDOR_DEVICE; or
      determining that the URB pertains to a bulk transfer and defines a command block wrapper having a command block specifying a vendor specific opcode.

20. The computer storage media of claim 19, wherein the vendor specific opcode comprises one of 0x06, 0xC6, or 0xC7.

* * * * *